W. McMURRAY.
MACHINE FOR HINGING BOXES.
APPLICATION FILED AUG. 13, 1908.

968,784.

Patented Aug. 30, 1910.

W. McMURRAY.
MACHINE FOR HINGING BOXES.
APPLICATION FILED AUG. 13, 1908.

968,784.

Patented Aug. 30, 1910.
6 SHEETS—SHEET 5.

W. McMURRAY.
MACHINE FOR HINGING BOXES.
APPLICATION FILED AUG. 13, 1908.

968,784.

Patented Aug. 30, 1910.
6 SHEETS—SHEET 6.

UNITED STATES PATENT OFFICE.

WILLIAM McMURRAY, OF HIGHWOOD, NEW JERSEY, ASSIGNOR TO THE GENERAL PACKAGE COMPANY, A CORPORATION OF NEW YORK.

MACHINE FOR HINGING BOXES.

968,784. Specification of Letters Patent. Patented Aug. 30, 1910.

Application filed August 13, 1908. Serial No. 448,433.

*To all whom it may concern:*

Be it known that I, WILLIAM McMURRAY, a citizen of the United States, and resident of Highwood, in the county of Bergen and State of New Jersey, have invented certain new and useful Improvements in Machines for Hinging Boxes, of which the following is a specification.

My invention relates to improvements in machines for hinging or connecting boards together for various purposes, such as for hinging together the parts of boxes, crates and the like, and for hinging covers upon boxes, by means of interlocked staples, and my invention has reference particularly to improvements in machines of the character set forth in my Patents No. 820,243, and No. 820,244 granted May 8, 1906.

The novel features of improvement will be more fully hereinafter set forth and then pointed out in the claims.

Reference is to be had to the accompanying drawings forming part hereof, wherein.

Similar numerals of reference indicate corresponding parts in the several views.

Figure 4:
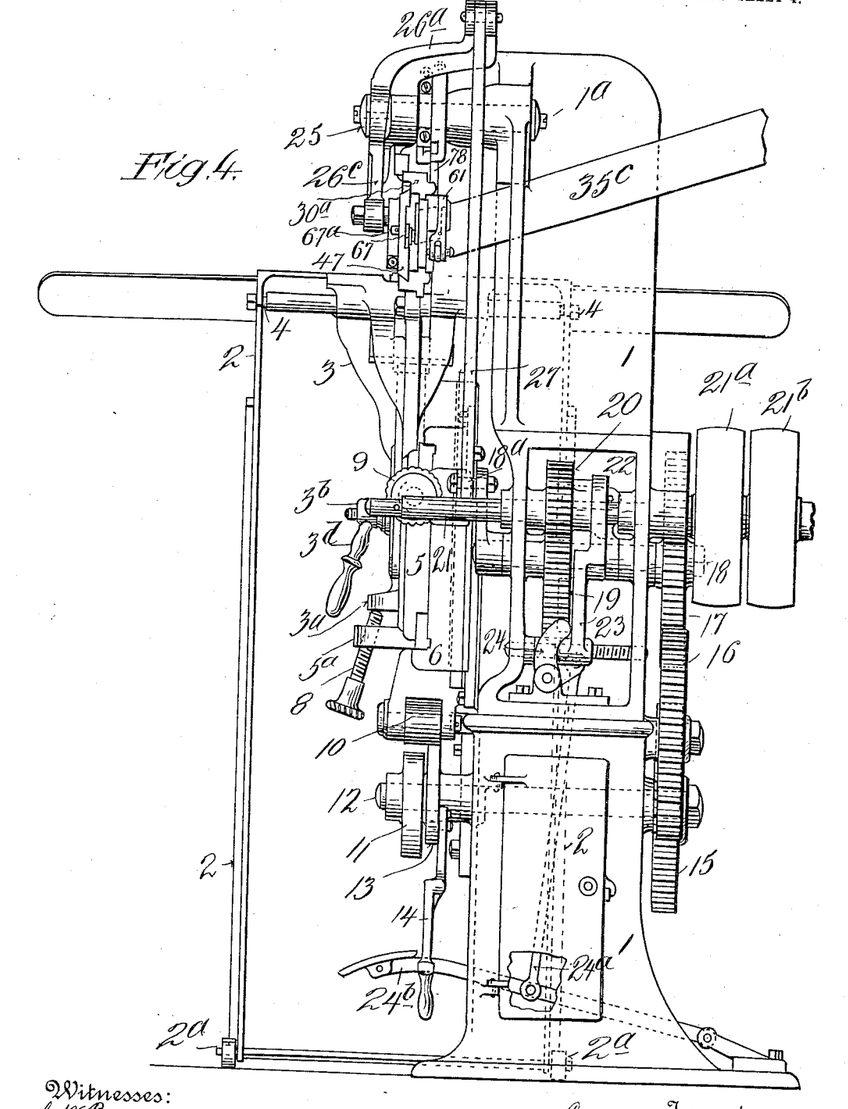
Fig. 4 is a side view of the machine looking from the right in Fig. 1.

In the drawings the numeral 1 indicates a suitable frame, the upper portion $1^a$ of which carries the main staple setting and driving devices. Beneath said driving devices is located a table or support 2 upon which boards, box parts or the like are to be placed to be hinged together. In order to accommodate relatively long boards upon the table the same is pivotally connected at its upper part with a vertically movable support 3, as by pivots at 4 (see Fig. 4), and the lower end of table 2 is shown provided with rollers $2^a$ to enable the table at its lower end to rest upon the floor, the arrangement being such that as the table rises and falls it will be partially supported by the floor, and thereby a portion of the weight of the table and the working strains are taken from the table supporting devices. The support 3 is mounted for vertical movement as well as lateral adjustment. For this purpose support 3 is guided in vertical ways in a block 5 which is supported to have lateral movement in horizontal ways in a block 6 carried in guides 7 on frame 1, a screw 8 carried by a lug $5^a$ on block 5 and co-acting with a lug $3^a$ on support 3 serving to adjust the latter vertically with respect to block 5, a screw $3^b$ passing through the slot $3^c$ in support 3 and attached to block 5 serving by means of the handle $3^d$ to lock support 3 in positions of vertical adjustment. A hand screw 9 carried by block 6 and operating against block 5 serves to regulate the lateral adjustment of block 5 with respect to block 6. At its lower portion block 6 carries a roller or projection 10 adapted to bear upon a cam 11 secured upon shaft 12 journaled in bearings in frame 1, which cam raises and lowers the table during operation of the machine.

At 13 is a cam loose on shaft 12 and provided with a handle 14 whereby said cam may be rotated to act upon roller 10 to raise the table for initial adjustment of the latter with respect to the boards to be operated upon by the staple driving devices, whereby the parts of the table support may be accurately adjusted primarily with respect to such boards and cam 11 will continue to control the up and down movements of the table in accordance with such adjustment, the boards being clamped as the table rises between the abutments A, $A^2$.

The abutment A may be formed directly on the frame or head of the machine while the abutment A², located at an angle to the abutment A, is made adjustable substantially in the plane of the edge of abutment A and constitutes a clench block for horizontally driven staples. Said abutment or block A² is shown guided on a support A³ and adjusted toward the table by a screw B and held in adjusted position by a screw C and nut D working in a slot c (see Fig. 3). Such adjustment of the abutment or clench block A² provides for different thicknesses of boards placed upon table 2 to be clamped in the angle or apex of recess E. As the table is to be raised and lowered each time two staples are interlocked to form a hinge, shaft 12 for this purpose is given an intermittent motion by means of suitable gearing. In the example illustrated said shaft carries a gear 15 meshing with an idle gear 16 journaled on the frame, which also meshes with a gear 17 on a shaft 18 that carries a gear 19 meshing with a gear 20 carried by a shaft 21 having fast and loose pulleys 21ª, 21ᵇ, which shaft 21 may be also operated by hand by a suitable handle 21ᶜ (Fig. 1) for use in adjusting the parts. Gear 19 is loose on its shaft 18 and adapted to be thrown into connection therewith as desired by a clutch, indicated generally at 22, which may be substantially of the character set forth in my aforesaid patents, in the illustration herein said clutch being shown provided with an arm 23 adapted to be operated by a lever 24 connected by link 24ª with a suitable treadle 24ᵇ whereby by operating said treadle, shaft 18 and cam 11 may be given one rotation for each complete operation of driving two interlocked staples.

Figure 1:
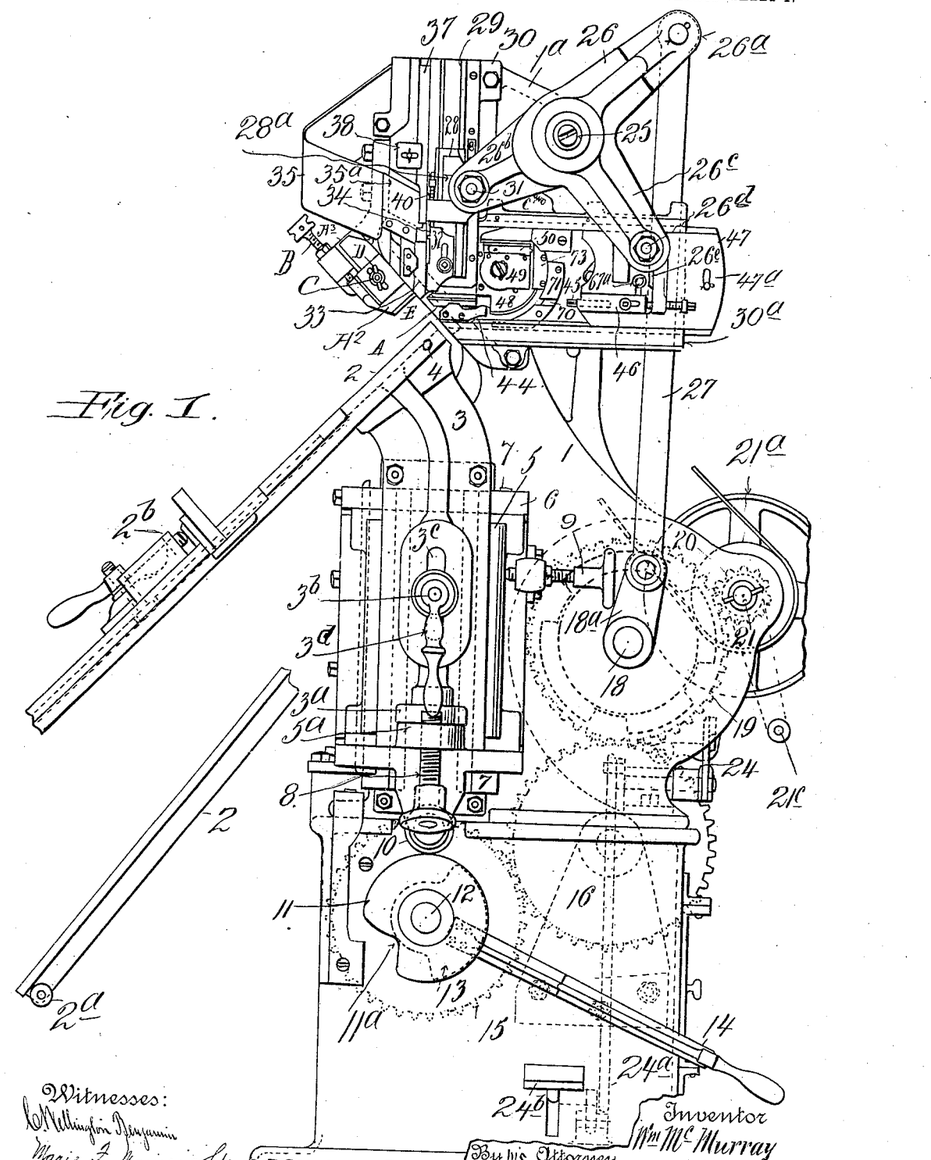
Figure 1 is a front elevation of a hinging machine embodying my improvements.
Figure 3:
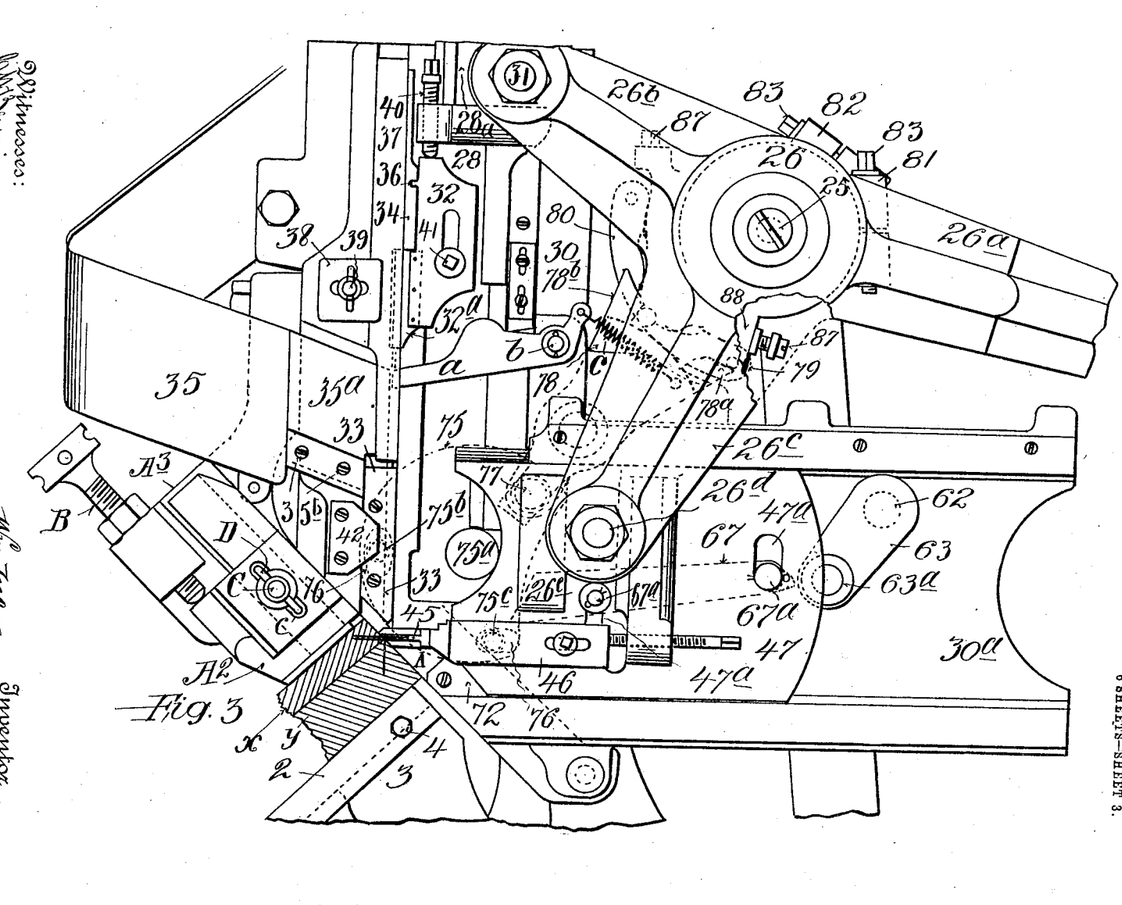
Fig. 3 is a similar view, further enlarged, of parts thereof shown in Fig. 1, showing a different position of the staple drivers.

By the arrangement set forth the table may be readily and accurately adjusted with respect to boards laid thereon, as indicated in Fig. 3, by placing the boards in position one upon the other and against a suitable adjustable guide or stop 2ᵇ on the table, loosening the screws 8, 9, and handle 3ᵈ, and then operating cam 13, by means of lever 14, which will bring the block 6 to the proper elevated position by raising roller 10 out of the depression 11ª of cam 11, in which said roller rests in the inactive position, and thereupon as the boards press against the abutments A, A² as the parts are raised and also as screw 8 is turned said boards will find the proper seat in the angle E, block 5 then sliding laterally a proper distance, and then the support 3 and block 5 will be locked by turning handle 3ᵈ, and screw 9 will be set up against the side of block 5, and then said parts will all remain in their proper positions, the cam 13 then being turned back, as in dotted lines in Fig. 1, to permit cam 11 to continue to raise and lower the table during operation of the machine, cam 13 only raising block 6 as high as cam 11 can raise said block during operation, cam 13 thus always determining the proper position of the table parts with respect to the action of cam 11 for boards of varying thickness.

At 25 is a suitable rockshaft supported in bearings on upright 1ª and shown provided with a three-armed crank 26 whose arm 26ª is connected by a link 27 with a crank 18ª on shaft 18 for rocking the shaft 25.

At 28 is a reciprocative block carried in suitable guides 29 on the head piece 30 that is secured to or formed on the frame part 1ª, which may be arranged substantially in manner set forth in my said Patent No. 820,244, and the arm 26ᵇ of crank shaft 26 is movably connected with said block, as by a projection or roller 31 working in a transverse groove or guide 28ª of block 28. Block 28 carries a vertically operating staple driver block 32 which may be arranged substantially as set forth in my said patent, which driver is adapted to push staples through a suitable guideway in a reciprocative staple-carrier or presser 33 suitably guided on head 30, and into which guideway the projecting portion 32ª (Figs. 3 and 10) of the staple driver is adapted to pass and slide.

At 34, Fig. 3, is a follower operated by driver block 32 to follow across the end of the staple track 35 to retain staples thereon after the driver descends, which follower is shown detachably connected with said block by means of a tongue and groove connection at 36. The staples hang on track 35 so as to slide down the same.

At 37 is a shield or guide plate detachably held in front of the driver and follower, as by a plate 38 and screw and nut 39, to help guide the driver and follower and when removed permits access to the latter.

A screw 40 carried by block 28 and operating against driver block 32 permits proper adjustment of the latter while the screw 41 serves to lock the block in position. The arm or lever a pivoted to head 30 at b and held in normal position, shown in Fig. 3, by spring c has its end adjacent to or in contact with the staple delivery end of track 35, in manner substantially as set forth in said patent, so that when driver 32ª descends the staple hanging at the end of the track may be pushed down through carrier or presser 33, to the board below. Said carrier or presser which receives the staples is suitably guided upon head 30 and is shown detachably held by plate 42 secured to said head by screws, whereby said carrier or presser may be removed, the object being to enable pressers of different lengths to be used according to the different length staples. The delivery end portion 35ª of track 35 may be separate from said track in line therewith and made of hardened steel and detachably connected with head 30 by means of screws 35ᵇ for enabling the replacement of said portion of the track when required.

Figure 2:
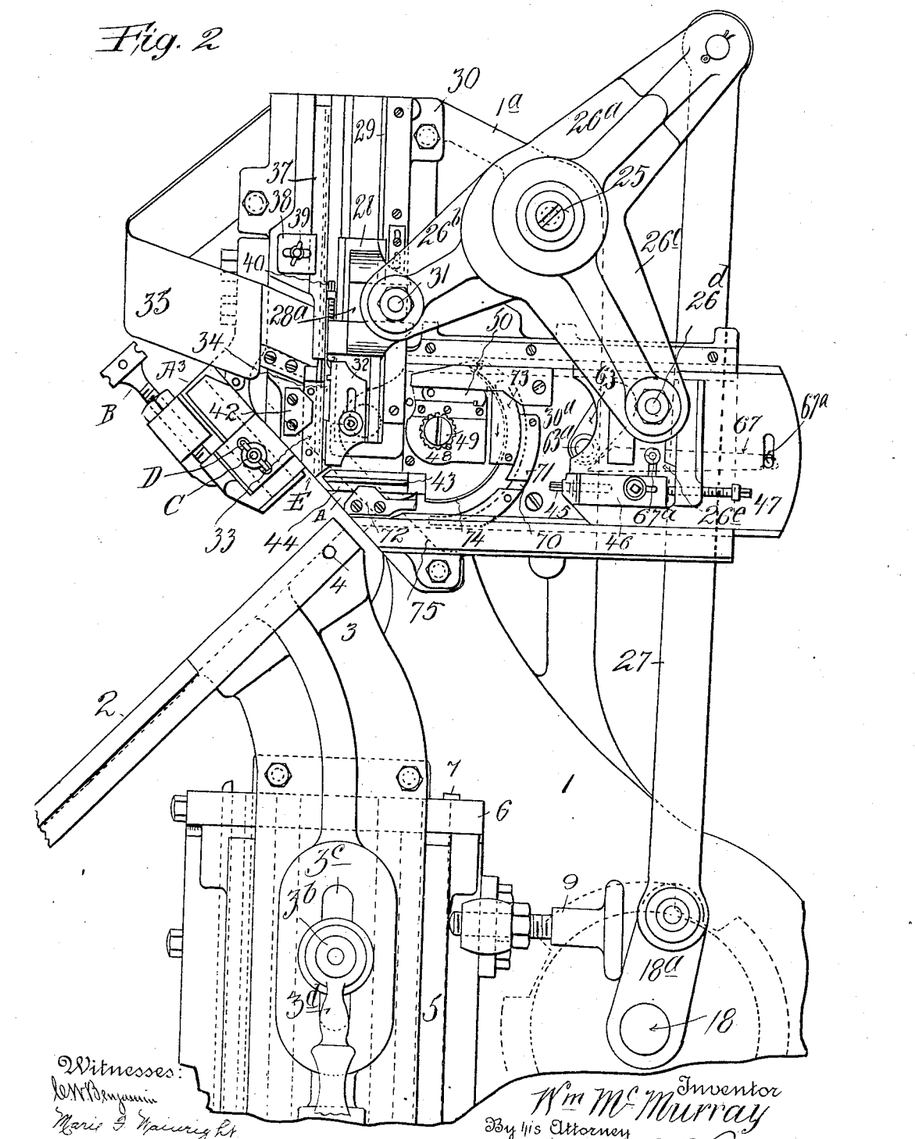
Fig. 2 is a similar view, enlarged, of parts thereof.
Figures 5, 6, 7, 8, 9:
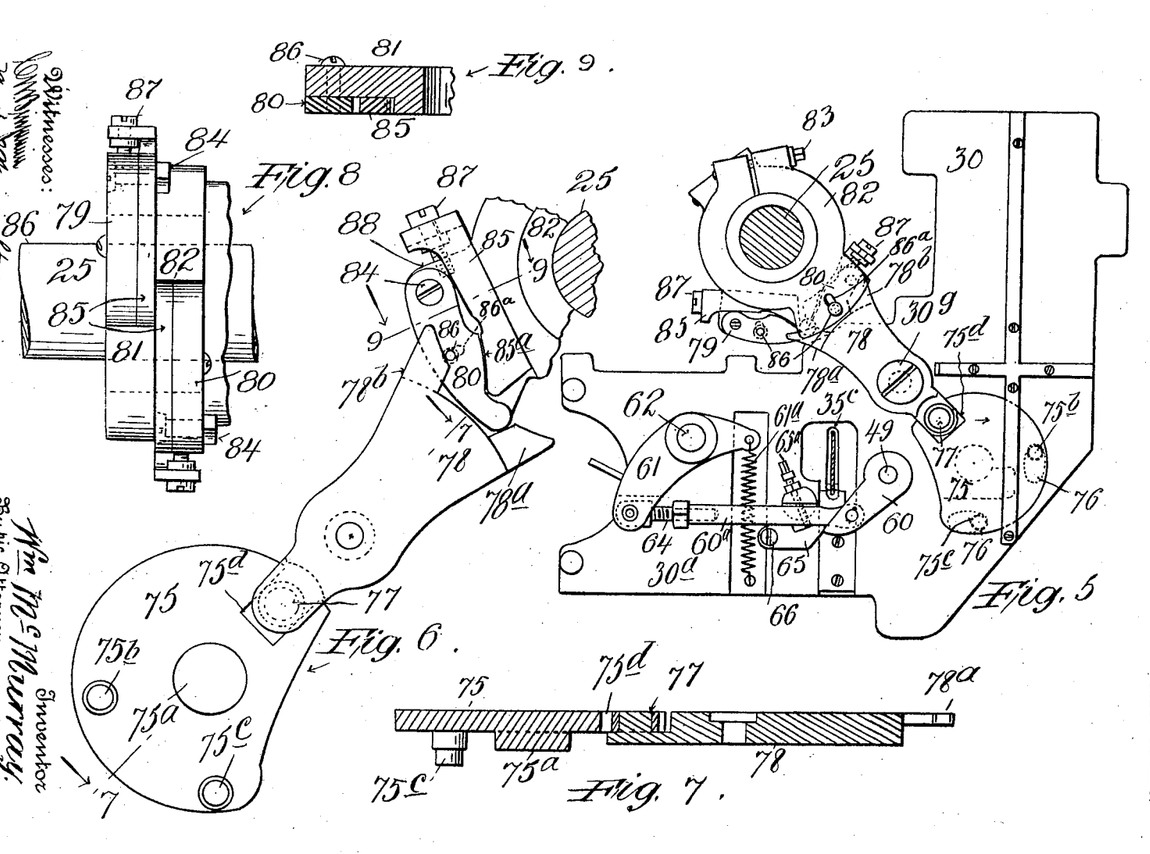
Fig. 5 is a detail view showing the parts for reciprocating the staple receivers or pressers and operating one of the staple feeders, looking at the head from the side opposite that shown in Fig. 1.
Fig. 6 is an enlarged detail view of parts shown in Fig. 5, looking from the opposite side.
Fig. 7 is a section on the line 7, 7, of Fig. 6.
Fig. 8 is an edge view of the parts shown in Fig. 5.
Fig. 9 is a section on the line 9, 9, in Fig. 6.

Horizontally driven staples, which interlock with the vertically driven staples, are driven through the guideway 43 in a presser 44 that is guided to reciprocate in the horizontally disposed arm 30ᵃ of head 30 and is adapted to be pushed against the boards upon the table, the staples being adapted to be delivered from a suitably disposed track 35ᶜ (Fig. 4) to the guideway 43 in presser 44. Said guideway is adapted to receive the staple driver 45 carried by a driver block 46 adjustably secured to a reciprocative slide or block 47 carried in suitable guides in arm 30ᵃ. Staples from track 35ᶜ are delivered to the presser 44 one by one in manner substantially similar to that set forth in my said Patent No. 820,244, the parts shown for this purpose comprising the rocking member or plate 48 carried by shaft or spindle 49 journaled in plate 49ᵃ secured on arm 30ᵃ. Said member 48 carries the spring 50 having finger 50ᵃ adapted to pick staples successively off the end of track 35ᶜ and carry them around in line with guideway 43 and driver 45 to be driven through said guideway into the board in front of the table; all substantially as shown in my said Patent No. 820,244. Spring 50 is carried by a slide 50ᵇ guided on plate 48, and is pushed forward by engaging a stop 50ᶜ when plate 48 is in the position shown in Fig. 10, said slide remaining in its forward position while moving downwardly into the position shown in Fig. 11. When driver 45 advances to drive the horizontal staple in the position shown in Fig. 11 it encounters the end of slide 50ᵇ and pushes the same upwardly whereupon spring 50 and its finger 50ᵃ will be moved outwardly to release the staple by its part 50ᵈ riding up on the incline 48ᵃ, in which position the finger and slide remains until finger 50ᵃ is again in line with the endmost staple on track 35ᶜ, whereupon slide 50ᵇ engages stop 50ᶜ and slide 50ᵇ is pushed forwardly and finger 50ᵃ snaps into said staple ready to push the same around upon the next turn of plate 48. The latter has a guide 73 pivoted to plate 48 at 73ᵃ (see Fig. 13) and against which the staples rest and are supported in their horizontal position, which guide bears against a curved guide 71 having a passage 70 for driver 45. The staples engage a curved track 74 by centrifugal action as plate 48 turns. A spring 72 attached to head part 30ᵃ holds guide 73 in proper alinement with presser 44 in the staple delivering position shown in Fig. 11. Spring 72 also bears against presser 44 and aids in guiding the same as it slides. The means for rocking plate 48 is shown more fully in Fig. 5, wherein an arm 60 is secured to shaft 49 and is pivotally connected by a link 60ᵃ with a crank 61 on shaft 62 journaled in arm 30ᵃ, on the opposite end of which shaft is secured a crank 63 for rocking said shaft. An adjusting screw 64 (Fig. 5) between link 60ᵃ and crank 61 enables adjustment of plate 48 to be made with respect to the distance between cranks 60 and 61, and at 65 is an adjustable stop against which crank 60 bears under the force of spring 61ᵃ, stop 65 being shown pivotally supported at 66 upon arm 30ᵃ, and a screw 65ᵃ carried by said arm and operating in connection with stop 65 serving to adjust the latter. Stop 65 may be held rigid by setting screw 66 tight. By this means adjustment of plate 48 may readily be made so that its spring finger 50ᵃ may be accurately brought to rest in proper alinement with the end of track 35ᶜ. Crank 63 is operated to rock plate 48 during reciprocation of slide 47, and for this purpose I have provided a bar 67 carried by slide 47 and having pins 67ᵃ adapted to travel in slots 47ᵃ in slide 47, the forward end of bar 67 being inclined and the rear end being in position to ride up on projection 63ᵃ of crank 63 as slide 47 moves outwardly. When slide 47 is in the position shown in Fig. 2 projection 63ᵃ will be in front of the inner inclined end of bar 67 so that when said slide moves toward table 2 said bar will engage said projection and turn crank 63 upwardly which will immediately cause plate 48 to swing in the direction of the arrow in Fig. 2 to carry a staple from the end of track 35ᶜ and present it in line with guideway 43 and driver 45, projection 63ᵃ then riding upon bar 67, and when slide 47 reaches the limit of its forward stroke projection 63ᵃ will pass away from the outer end of bar 67, and then on the next outward stroke of slide 47 bar 67 will ride up on projection 63 to again assume the position shown in Fig. 2. Bar 67 has free up and down bodily movement by reason of pins 67ᵃ sliding in slots 47ᵃ. Slide 47 is reciprocated by means of crank arm 26ᶜ having a projection 26ᵈ entering a recess 26ᵉ in the outer face of slide 47.

It is desirable that the machine be adapted to drive staples of different lengths and yet the staple receivers or pressers 33 and 44 should not be moved to the boards on the table until a portion of the staples have respectively entered the guideways in such pressers, and the latter should then be moved to and in contact with the boards as required. For this purpose means are provided for regulating the movement of the pressers 33 and 44, as required, whereby the pressers can be given an earlier action for relatively long staples and a later action for relatively short staples. To this end at 75 is a rocking member journaled on head 30 and it is shown provided with a hub 75ᵃ journaled in an opening in said head, which member is provided with projections or pins 75$^b$, 75$^c$, that pass through corresponding slots 76 in head 30 and enter openings in the corresponding receivers or pressers 33 and 44 respectively. Rocking member 75 has a slot 75$^d$ receiving a projection 77 from a rock arm or lever 78 (Figs. 5, 6, and 7) that is pivoted to head 30 as by stud 30$^g$. Arm or lever 78 is to be rocked as shaft 25 is rocked, but is given a more limited rocking motion than said shaft, and adjusting means are also provided for controlling such rocking movement of arm or lever 78. For such purpose arm 78 is provided at its outer end with fingers 78$^a$, 78$^b$, at the corners, but which fingers each are of less thickness than arm 78 and are arranged adjacent to opposite faces thereof so as not to be alined with each other.

To shaft 25 are connected dogs 79 and 80, dog 79 being adapted to engage finger 78$^b$, and dog 80 being adapted to engage the finger 78$^a$, and said dogs are also adapted to ride upon the outer curved ends of said fingers to at such time lock arm 78 in position. Said dogs are respectively carried by adjustable collars 81, 82, mounted upon shaft 25, said collars being shown split or divided and provided with clamping screws 83, for locking said collars in positions of adjustment. Said dogs are also adapted to be adjusted on their supports at their supporting screws 84, and for this purpose I have shown blocks 85 having inclined faces 85$^a$ (Fig. 6) adapted to engage the corresponding faces of dogs 79 and 80 to move said dogs outwardly, which dogs are adapted to be secured in place by screws 86 that are threaded in the respective dogs and adapted to have adjustment in slots 86$^a$ in the adjacent part of the corresponding collar. Blocks 85 are provided with screws 87 meshing in threaded apertures in the extensions 88 of collars 81, 82, for adjusting the blocks 85. By the means described the dogs 79 and 80 may be caused to engage fingers 78$^a$, 78$^b$, earlier or later with respect to the rocking of shaft 25 as desired, and said dogs can be adjusted in a radial direction with respect to said shaft to engage the ends of fingers 78$^a$, 78$^b$ as required.

With the dogs adjusted in the required position, as shaft 25 rocks in one direction dog 79 will engage finger 78$^b$ to rock the arm 78 correspondingly and then said dog will ride up on the end of said finger and hold it set in such position during any further forward movement of said shaft, and on the return stroke dog 79 will slide away from said finger and dog 80 will next engage finger 78$^a$ and rock the arm 78 in the reverse direction and by riding on the end of said finger will lock said arm in such position until the proper point of the return stroke, when dog 79 will again operate said arm, and so on back and forth. This rocking motion of arm 78 communicates corresponding motion to member 75 which through its projections 75$^b$, 75$^c$ causes the staple receivers or pressers 33 and 44 to be reciprocated as required. If relatively long staples are fed to the pressers the collars 81, 82 will be adjusted upon shaft 25 to cause the corresponding pressers to have a relatively earlier action, as the long staples will enter the guideways of said pressers sooner, whereas, if short staples are fed the receivers or pressers will be given a later action by the proper adjustment of collars 81, 82 on shaft 25, so that said pressers will not start to move until some part of such short staples are within the guideways of said pressers. This arrangement permits ready and accurate adjustment of the pressers and timing of the action of the same with respect to the action of the corresponding staple drivers and it is permitted by the ready and convenient adjustment of collars 81, 82 on shaft 25.

Figures 10, 11, 12, 13:
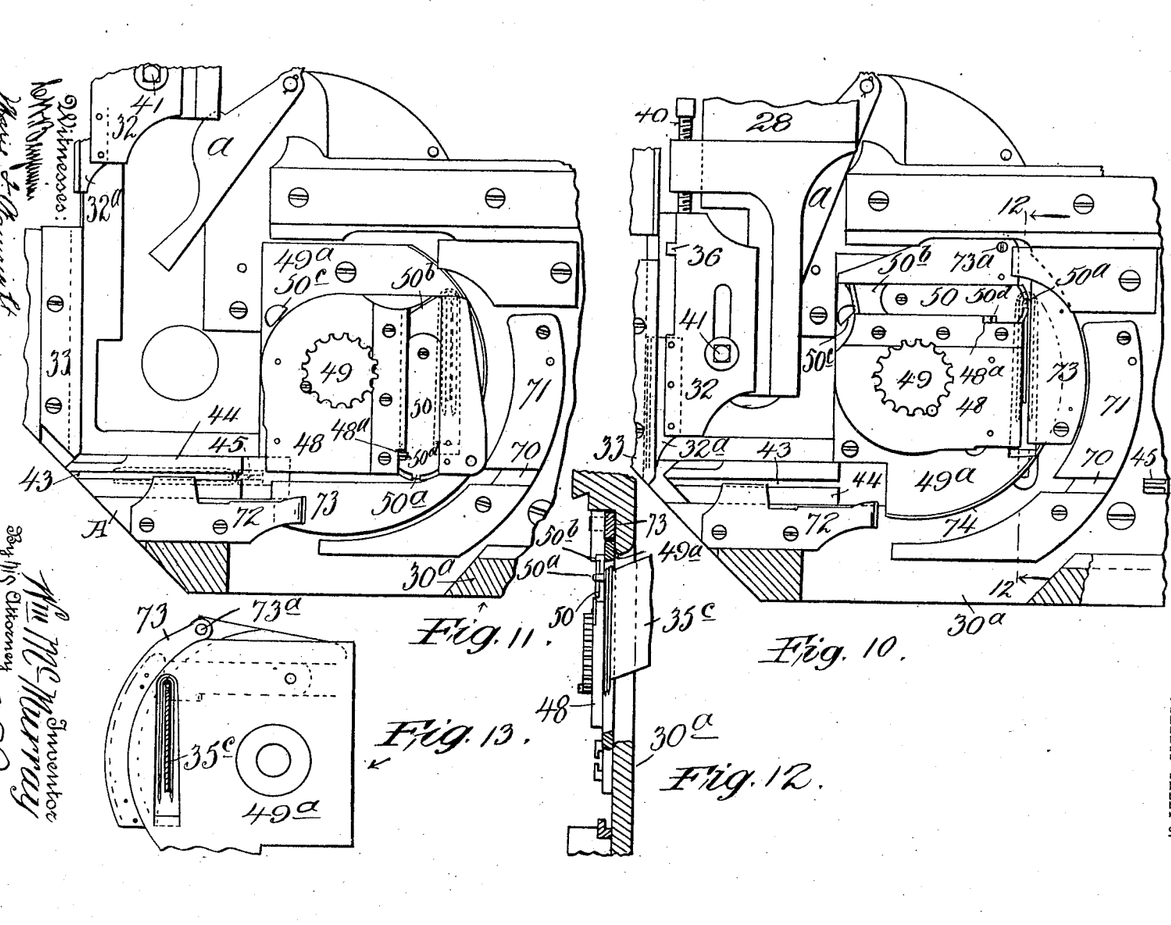
Fig. 10 is an enlarged detail view, parts being removed, illustrating the staple driving device in the position when the vertical staple is about being driven.
Fig. 11 is a similar view illustrating the position when the horizontal staple is about to be driven.
Fig. 12 is a cross section on the line 12, 12, in Fig. 10.
Fig. 13 is a detail view of the reverse side of parts shown in Fig. 10.

The operation may be described as follows:—The table having been adjusted to accommodate boards $x$, $y$, as desired, as shown in Fig. 3, which boards may be placed upon each other, the joint between the boards being brought substantially in line with the point at which the vertically and horizontally driven staples are caused to interlock, as at the angle of the planes of movement of the staple drivers, the clench block or abutment A$^2$ being properly adjusted, cam 11 so turned that projection 10 enters the recess 11$^a$, and staples being placed upon tracks 35 and 35$^a$ in suitable manner so as to slide down said tracks, the staple driving parts being then substantially in the normal position shown in Fig. 3, and power being applied to shaft 21 the treadle is next operated to cause the clutch to couple shaft 18 to the driving shaft; crank 18$^a$ and cam 11 will then revolve (and the treadle will be released) and thereupon shaft 25 will rock and the vertical driver 32$^a$ will descend and push a staple from between the end of track part 35$^a$ and arm $a$ partly into receiver or presser 33 and thereupon dog 80 will engage finger 78$^a$ to cause member 75 to rock and its pin 75$^b$ will push receiver 33 downwardly into contact with the board $x$ beneath it, and dog 80 will serve to hold the receiver in such position, the staple driving parts then changing from the position shown in Fig. 3 to the positions shown in Fig. 1 whereupon the vertical staple will be driven, but a portion of the looped end of the staple will be left projecting to receive a horizontally driven staple. On the return stroke of shaft 25 the slide 47 will advance toward the table from the position shown in Fig. 1, and bar 67 will engage projection 63$^a$ and rock the shaft 62 until said projection slides up on bar 67 whereupon link 60ª and arm 60 will rock plate 49 and cause the lowermost staple on track 35ª to be picked by finger 50ª and carried around in line with guideway 43 of staple receiver or presser 44, as indicated in Fig. 11, in position for driver 45 which continues to advance to drive said staple into the boards and through the projecting portion of the first driven staple, but at right angles thereto, and during such time the dog 80 will have held the arm 78 and member 75 in set position while the dog returns along the end of finger 78ª, but after the horizontal staple enters its receiver or presser 44 and before the staple is driven into the board the dog 80 will have moved away from finger 78ª and dog 79 will encounter finger 78ᵇ to rock the parts 78 and 75 reversely to their previously mentioned movement, whereupon pin 75ᵇ will raise presser 33 from board x, as shown in Fig. 3, and presser 44 will simultaneously be pushed by pin 75ᶜ toward and against board y and there held by reason of dog 79 traveling over the end of finger 78ᵇ, the presser 44 then being in the position substantially as shown in Figs. 3 and 11, and thereupon the continued forward motion of driver 45 will drive the horizontal staple to its final position interlocked with the vertical staple at the joint between the two boards; now, as soon as the recess 11ª of cam 11 next comes under projection 10, the latter will ride down into said recess (the clutch now uncoupling the gear by reason of the previous release of treadle 24ᵇ) and the table will descend lowering the box parts from engagement with the abutments above, and the parts will come to rest substantially in the normal position shown in Fig. 3 and as projection 63ª has then slipped off the outer end of bar 67 the horizontal staple picking plate 49 and devices operated therewith, will, by the action of spring 61ª, be returned to their normal or inactive positions ready to pick another staple from the end of track 35ª.

In this application I do not claim the pivotal table 2 and the means for raising and lowering and for adjusting the same as that is embraced in my application filed October 2nd, 1909, Serial No. 520,664.

Changes may be made in the details of construction and arrangement of parts shown and described without departing from the scope of the appended claims.

Having now described my invention what I claim is:—

1. The combination of a movable staple carrier, and means for guiding the same, with a driver, and means to reciprocate said carrier comprising adjustable devices for regulating the movement of the carrier with respect to but independent of the movement of the driver.

2. The combination of a movable staple carrier, and means for guiding the same, with a driver, an oscillatory member connected with said carrier, means for simultaneously moving said carrier and driver, and adjustable means for causing the carrier to move earlier or later with respect to but independent of the movement of the driver.

3. The combination of a movable staple carrier, and means for guiding the same, with a driver, an oscillatory member connected with the carrier, a shaft, means for reciprocating the driver by the shaft, and means independent of the driver and actuated by said shaft for oscillating said member to reciprocate the carrier.

4. The combination of a movable staple carrier, and means for guiding the same, with a driver, an oscillatory member connected with the carrier, a shaft, means for reciprocating the driver by the shaft, and devices independent of the driver and actuated by said shaft for operating said member to reciprocate the carrier comprising means for adjusting the movement of the carrier with respect to the movement of the driver to cause the carrier to move earlier or later with respect to the movement of the driver.

5. The combination of a movable staple carrier, and means for guiding the same, with a driver, a movable member connected with said carrier, a shaft, an oscillatory arm connected with said member, and means operated by said shaft for operating said arm.

6. The combination of a movable staple carrier, and means for guiding the same, with a driver, a movable member connected with said carrier, a shaft, an oscillatory arm connected with said member, and means operated by said shaft for operating said arm, said means being arranged to move said arm in opposite directions and hold the arm in set position at the limit of its movement in opposite directions.

7. The combination of a movable staple carrier, and means for guiding the same, with a driver, a movable member connected with said carrier, a shaft, an oscillatory arm connected with said member, and devices adjustable with respect to said shaft to operate said arm.

8. The combination of a movable staple carrier, and means for guiding the same, with a driver, a movable member connected with said carrier, a shaft, an oscillatory arm connected with said member, dogs to operate said arm, and means adjustably carried by said shaft and carrying said dogs.

9. The combination of a movable staple carrier, and means for guiding the same, with a driver, a movable member connected with said carrier, a rock arm connected with said member and provided with fingers, dogs adapted to engage said fingers respectively, and means for oscillating said dogs.

10. The combination of a movable staple carrier, and means for guiding the same, with a driver, a movable member connected with said carrier, a rock arm connected with said member and provided with fingers, dogs adapted to engage said fingers, and means for oscillating said dogs, said dogs being arranged to push the fingers and then engage the fingers to hold the arm in set position.

11. The combination of a movable staple carrier, and means for guiding the same, with a driver, a movable member connected with said carrier, a rock arm connected with said member and provided with fingers, dogs adapted to engage said fingers, a shaft, and collars adjustably carried by said shaft, said dogs being carried by said collars.

12. The combination of a movable staple carrier, and means for guiding the same, with a driver, a movable member connected with said carrier, a rock arm connected with said member and provided with fingers, dogs adapted to engage said fingers, a shaft, collars adjustably carried by said shaft, said dogs being carried by said collars, and means for adjusting said dogs toward said arm.

13. The combination of a movable staple carrier, and means for guiding the same, with a driver, a movable member connected with said carrier, a rock arm connected with said member and provided with fingers, dogs adapted to engage said fingers, collars adjustably carried by said shaft, said dogs being carried by said collars, blocks carried by said collars, inclined faces between the blocks and dogs, and means for adjusting said blocks with respect to the dogs.

14. The combination of a movable staple carrier, and means for guiding the same, with a driver, an oscillatory arm movably connected with said carrier and provided with fingers that are out of line with each other, dogs adapted to engage said fingers respectively, means for oscillating said dogs, and means for adjusting said dogs with respect to said fingers.

15. The combination of a movable staple carrier, and means for guiding the same, with a driver, an oscillatory arm movably connected with said carrier and provided with fingers that are out of line with each other, dogs adapted to engage said fingers respectively, means for oscillating said dogs, and means for adjusting said dogs with respect to said fingers, said dogs being arranged to move the fingers and then ride upon the fingers to hold the arm in a set position.

16. The combination of movable staple carriers, means for guiding the same at an angle to each other, staple drivers for said carriers, means to guide the drivers, a shaft, means for operating said drivers by said shaft, a movable member connected with said carriers, and adjustable means for operating said member arranged for regulating the movement of said member with respect to the movement of the corresponding carrier.

17. The combination of movable staple carriers, means for guiding the same at an angle to each other, staple drivers for said carriers, means to guide the drivers, a shaft, means for operating said drivers by said shaft, a movable member connected with said carriers, and adjustable means operated by said shaft for controlling said member to regulate the movement of said carriers with respect to the movement of the corresponding driver.

18. The combination of staple carriers, means for guiding them at an angle to each other, drivers for said carriers, a shaft, means for reciprocating said drivers by said shaft, an oscillatory member connected with said carriers, an arm connected with said member, and adjustable dogs carried by said shaft for operating said arm.

19. The combination of staple carriers, means for guiding them at an angle to each other, drivers for said carriers, a shaft, means for reciprocating said drivers by said shaft, an oscillatory member connected with said carriers, an arm connected with said member, and adjustable dogs carried by said shaft for operating said arm, said arm having fingers out of line with each other arranged to be engaged by said dogs, said dogs being arranged to engage said fingers at the end of the stroke to hold the arm in set position.

20. The combination of a staple carrier, means to guide the same, a driver, means to operate the driver, a staple delivering track, an oscillatory member provided with means to pick staples off the end of said track and to transfer them to a position in line with said carrier, an arm connected with said member, means to rock said arm, an adjustable stop pivotally supported in line with said arm to engage the same, and a screw to regulate the position of said stop.

21. The combination of a staple carrier, means for guiding the same, a driver, a staple delivering track located at an angle to the carrier, an oscillatory member provided with means to pick staples from the track, a guide carried by the said member adjacent the staple picking means, and a spring to bear on said guide and retain it in operating position when the staple is in line with said carrier.

22. The combination of a staple carrier, means for guiding the same, a driver, a staple delivering track at an angle to the carrier, an oscillatory member provided with means to pick staples from the track, a guide carried by the said member adjacent the staple picking means, and a spring to bear on said guide and retain it in operating position when the staple is in line with said carrier, said spring also bearing on said carrier.

23. The combination of a track, an oscillatory member having means to pick staples off the track, an arm connected with said member, a crank connected with said arm to rock the same, a reciprocative slide provided with slots spaced apart, a bar having pins adapted to travel in said slots for movably supporting said bar, said crank having a projection to engage said bar, one end of said bar being inclined to engage said projection to rock said crank, said projection being adapted to slide under and lift said bar bodily in one direction of movement of the slide, a driver connected with said slide, and a staple carrier in line with said driver.

Signed at New York city, in the county of New York, and State of New York, this 3rd day of August, A. D. 1908.

WILLIAM McMURRAY.

Witnesses:
   EDWIN B. STRANGE,
   ARTHUR M. WIGHT.